United States Patent
Park et al.

(10) Patent No.: US 7,887,605 B2
(45) Date of Patent: Feb. 15, 2011

(54) REFORMER FOR FUEL CELL

(75) Inventors: Zin Park, Suwon-si (KR); Ju-Yong Kim, Suwon-si (KR); Dong-Myung Suh, Suwon-si (KR); In-Hyuk Son, Suwon-si (KR); Dong-Uk Lee, Suwon-si (KR); Eun-Suk Cho, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1173 days.

(21) Appl. No.: 11/254,825

(22) Filed: Oct. 19, 2005

(65) Prior Publication Data

US 2006/0093532 A1    May 4, 2006

(30) Foreign Application Priority Data

Oct. 28, 2004    (KR) .................. 10-2004-0086806

(51) Int. Cl.
*B01J 19/00* (2006.01)
(52) U.S. Cl. .......................... 48/61; 422/129
(58) Field of Classification Search ................. 422/139; 48/61
See application file for complete search history.

(56) References Cited

U.S. PATENT DOCUMENTS

| 2002/0071797 | A1 | 6/2002 | Loffler et al. |
| 2003/0064010 | A1* | 4/2003 | Allen .......................... 422/190 |
| 2003/0159354 | A1* | 8/2003 | Edlund et al. .............. 48/127.9 |
| 2004/0148859 | A1 | 8/2004 | Kawamura et al. |
| 2004/0244290 | A1* | 12/2004 | Yamamoto et al. ......... 48/127.9 |

FOREIGN PATENT DOCUMENTS

| JP | 8-329963 | 12/1996 |
| JP | 10-208758 | 8/1998 |
| JP | 2004-006265 | 1/2004 |
| JP | 2004-091218 | 3/2004 |
| JP | 2004-141794 | 5/2004 |
| JP | 2004-256387 | 9/2004 |
| JP | 2004-290879 | 10/2004 |
| WO | WO 03/055585 A1 | 7/2003 |

(Continued)

OTHER PUBLICATIONS

European Search Report dated Feb. 8, 2006 for European Patent Application EP 05 11 0004 in the same of Samsung SDI Co., Ltd.

(Continued)

*Primary Examiner*—Alexa D Neckel
*Assistant Examiner*—Imran Akram
(74) *Attorney, Agent, or Firm*—Christie, Parker & Hale, LLP (57) ABSTRACT

A reformer for a fuel cell including: at least one reaction plate in which a channel is formed on a surface thereof; a cover plate disposed on the surface of the reaction plate; a bonding part which is formed between the reaction plate and the cover plate and which integrally fixes the reaction plate and the cover plate to each other; and a heat processing part which is formed outside the channel and which reduces a contact area between the reaction plate and the cover plate and controls thermal energy supplied to the reaction plate.

22 Claims, 8 Drawing Sheets

FOREIGN PATENT DOCUMENTS

WO  WO 2004037406 A1 * 5/2004

OTHER PUBLICATIONS

Patent Abstracts of Japan, Publication No. 08-329963, dated Dec. 13, 1996, in the name of Tadayoshi Adachi.

Patent Abstracts of Japan, Publication No. 10-208758, dated Aug. 7, 1998, in the name of Isanori Akagi.

Japanese Office action dated Nov. 24, 2009, for corresponding Japanese application 2005-312575, noting listed references in this IDS.

* cited by examiner

REFORMER FOR FUEL CELL

CROSS REFERENCE TO RELATED APPLICATION

This application claims the benefit of Korean Patent Application No. 10-2004-0086806, filed in the Korean Intellectual Property Office on Oct. 28, 2004, the content of which is incorporated herein by reference.

BACKGROUND OF THE INVENTION

1. Field of the Invention

The present invention relates to a reformer for a fuel cell and more particularly to a plate type reformer for a fuel cell.

2. Description of the Related Art

As is well known, a fuel cell is an electricity generating system that generates electrical energy through an electrochemical reaction between oxygen and hydrogen contained in hydrocarbon materials such as methanol, ethanol, or natural gas.

A polymer electrolyte membrane fuel cell (hereinafter, referred to as PEMFC) has been recently developed. The PEMFC has excellent output characteristics, a low operating temperature, and fast starting and response characteristics. Therefore, the PEMFC has a wide range of applications including as a mobile power source for vehicles, as a distributed power source for homes or other buildings, and as a small-size power source for electronic apparatuses.

A fuel cell system employing the PEMFC scheme includes a stack, a reformer, a fuel tank, and a fuel pump. The stack constitutes an electricity generator set having a plurality of unit cells (or electricity generators), and the fuel pump supplies fuel stored in the fuel tank to the reformer. Then, the reformer reforms the fuel to generate hydrogen gas (or hydrogen-rich reformed gas) and supplies the hydrogen gas to the stack.

In more detail, the reformer generates the hydrogen gas from the fuel through a chemical catalytic reaction using thermal energy. That is, the reformer includes a heat source part for generating the thermal energy, a reforming reaction part for generating reformed gas containing hydrogen from the fuel by using the thermal energy, and a carbon-monoxide reducing part for reducing the concentration of carbon monoxide contained in the reformed gas.

In the reformer of the conventional fuel cell system, the heat source part, the reforming reaction part, and the carbon-monoxide reducing part are formed in a vessel shape and are separately distributed from each other and connected to each other through pipes. Because of this, heat cannot be directly exchanged between the respective parts, thereby causing an inefficiency from the viewpoint of heat delivery. In addition, since the respective parts are separately distributed, the entire fuel cell system cannot be compactly embodied.

SUMMARY OF THE INVENTION

An embodiment of the present invention provides a plate type reformer for a fuel cell which can directly exchange heat between parts thereof and which can compactly embody the entire fuel cell system.

According to an embodiment of the present invention, there is provided a reformer for a fuel cell including: at least one reaction plate having a channel formed in a surface thereof; a cover plate disposed on the surface of the at least one reaction plate; a bonding part formed between the at least one reaction plate and the cover plate to integrally fix the at least one reaction plate and the cover plate to each other; and a heat processing part formed outside the channel, the heat processing part being adapted to reduce a contact area between the at least one reaction plate and the cover plate and to control thermal energy supplied to the at least one reaction plate.

In the reformer, the reaction plate may have a first portion defining an area of the channel and a second portion defining an area other than the first portion.

In the reformer, the heat processing part may have at least one groove formed on at least one edge of the reaction plate corresponding to the area of the second portion. In this case, the at least one groove may include a vacuum space adapted to maintain a vacuum state and formed through a bonding between the at least one reaction plate and the cover plate; and the vacuum space may include a heat insulating part adapted to insulate a heat supplied to the at least one reaction plate. Alternatively, the at least one groove may include a cooling passage adapted to allow a cooling medium to flow and formed through a bonding between the at least one reaction plate and the cover plate; and the cooling passage may include a cooling part adapted to cool a heat supplied to the at least one reaction plate.

The at least one groove may be formed on edges of the at least one reaction plate so as to surround the entire first portion. In addition, a plurality of grooves may be provided.

The heat processing part may include a first hole formed on at least one edge of the at least one reaction plate corresponding to the area of the second portion and a second hole formed on an edge of the cover plate corresponding to the first hole to communicate with the first hole.

In the reformer, the bonding part may integrally fix the reaction plate and the cover plate by brazing a contact portion between the at least one reaction plate and the cover plate. In this case, the bonding part may be made of metal having a melting point lower than a melting point of a material constituting the at least one reaction plate and the cover part.

In the reformer, a catalyst layer may be formed in the channel of the reaction plate.

According to another embodiment of the present invention, there is provided a reformer for a fuel cell including: a plurality of reaction parts formed by stacking a plurality of reaction plates adjacent to one another, each of the reaction plates includes a channel formed in a surface thereof; a cover plate disposed on a surface of an uppermost one of the reaction plates; a bonding part formed between the reaction plates and between the uppermost one of the reaction plates and the cover plate to integrally fix the reaction plates and the cover plate to each other; and a heat processing part formed in at least one of the reaction plates to control thermal energy supplied to the reaction plates.

In the reformer for a fuel cell, the heat processing part may have at least one groove formed on at least one edge of each of the reaction plates. In this case, the at least one groove may include a vacuum space adapted to maintain a vacuum state and formed through a bonding of the reaction plates and the cover plate; and the vacuum space may include a heat insulating part adapted to insulate a heat supplied to the reaction parts. Alternatively, the at least one groove may include a cooling passage adapted to allow a cooling medium to flow and formed through a bonding of the reaction plates and the cover plate; and the cooling passage may include a cooling part adapted to cool a heat supplied to the reaction parts.

The bonding part may be formed by brazing metal.

In the reformer for a fuel cell, a catalyst layer may be formed in the channel of each of the reaction plates.

The reaction parts may include: a heat source part having a heat-source-part reaction plate including a first catalyst layer formed in its channel, the heat source part being adapted to generate thermal energy by an oxidation reaction of a fuel and an oxidant; and a reforming reaction part having a reforming-reaction-part reaction plate including a second catalyst layer formed in its channel, the reforming reaction part being adapted to generate a reformed gas from the fuel by a reforming reaction of the fuel using the thermal energy generated by the heat source part.

In the reformer for a fuel cell, the reaction parts may further include at least one carbon-monoxide reducing part having a carbon-monoxide-reducing-part reaction plate including at least one of a third catalyst layer formed in its channel, the at least one carbon-monoxide reducing part being adapted to reduce a concentration of carbon monoxide contained in the reformed gas generated by the reforming reaction part.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

In the following detailed description, certain embodiments of the present invention are shown and described, by way of illustration. As those skilled in the art would recognize, the described embodiments may be modified in various ways, all without departing from the spirit or scope of the present invention. Accordingly, the drawings and description are to be regarded as illustrative in nature, rather than restrictive.

Figure 1:
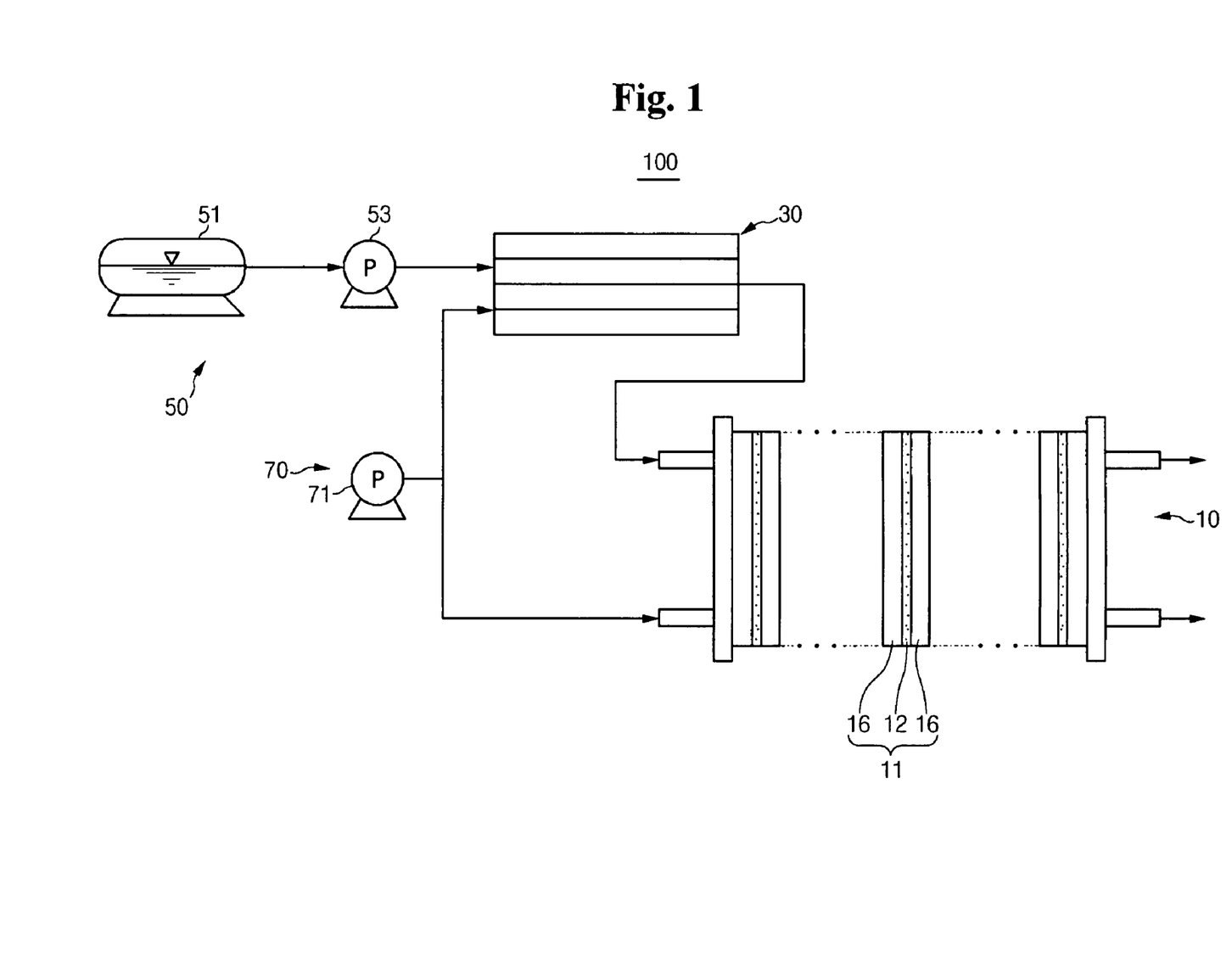
FIG. 1 is a block diagram schematically illustrating an entire structure of a fuel cell system according to an embodiment of the present invention.

FIG. 1 is a block diagram schematically illustrating an entire structure of a fuel cell system 100 according to an embodiment of the present invention.

Referring to FIG. 1, the fuel cell system 100 according to an embodiment of the present invention employs a scheme where fuel is reformed to generate a hydrogen-containing reformed gas and electrical energy is generated through an oxidation of the reformed gas and a reduction of an oxidant gas.

The fuel used in the fuel cell system 100 can include a liquid or gaseous fuel containing hydrogen, such as methanol, ethanol, gasoline, LPG, LNG, and the like. However, a liquid fuel exemplifies (or illustrates by example) the fuel being used in the following description.

The fuel cell system 100 may utilize pure oxygen stored in a particular storage device as the oxidant gas or may utilize air containing oxygen as the oxidant gas. However, air containing oxygen exemplifies (or illustrates by example) the oxidant gas being used in the following description.

The fuel cell system 100 includes a stack 10 for generating electrical energy through oxidation and reduction of hydrogen and oxygen respectively, a reformer 30 for reforming fuel to generate a reformed gas containing hydrogen and for supplying the reformed gas to the stack 10, a fuel supply unit 50 for supplying the fuel to the reformer 30, and an oxygen supply unit 70 for supplying the air containing oxygen to the stack 10 and the reformer 30.

The stack 10 includes electricity generators 11 in cell units (or unit cells) and is connected to the reformer 30 and the oxygen supply unit 70 and is supplied with the reformed gas from the reformer 30 and with the air containing oxygen from the oxygen supply unit 70 to generate electrical energy through oxidation and reduction of hydrogen and oxygen respectively.

Each of the electricity generators 11 is a unit cell of the fuel cell and includes separators 16 (also referred to as bipolar plates) that are disposed on both surfaces of a conventional membrane-electrode assembly (MEA) 12.

Therefore, the stack 10 can be formed by stacking the electricity generators 11 adjacent to one another to form a set of the electricity generators 11. The structure of the stack 10 of FIG. 1 is substantially the same as a stack of a conventional polymer electrolyte membrane fuel cell, and a detailed description thereof will be omitted.

In the present embodiment, the reformer 30 has a structure for generating thermal energy by an oxidation reaction of the fuel and the air; a structure for generating the reformed gas containing hydrogen by a catalytic reaction using the thermal energy, such as a steam reforming reaction, a partial oxidation, and/or an auto-thermal reaction; and a structure for reducing the concentration of carbon monoxide by a water-gas shift (WGS) reaction and/or a preferential CO oxidation (PROX) reaction of carbon monoxide contained in the reformed gas. The structure of the reformer 30 will be described below in more detail with reference to FIGS. 2 and 3.

The fuel supply unit 50 for supplying the fuel to the reformer 30 includes a fuel tank 51 for storing the fuel and a fuel pump 53 for pumping the fuel stored in the fuel tank 51.

The oxygen supply unit 70 includes an air pump 71 for pumping in air with a predetermined pumping power and for supplying the pumped-in air to the electricity generators 11 of the stack 10 and the reformer 30. In the present embodiment, the oxygen supply unit 70 has a structure for supplying the air to the stack 10 and the reformer 30 through the use of the single air pump 71 as illustrated in FIG. 1. However, the present invention is not limited to the structure shown in FIG. 1, and a pair of air pumps connected to the stack 10 and the reformer 30, respectively, may be provided instead.

The structure of the reformer 30 according to an embodiment of the present invention is described in more detail with reference to FIGS. 2 and 3.

Figure 2:
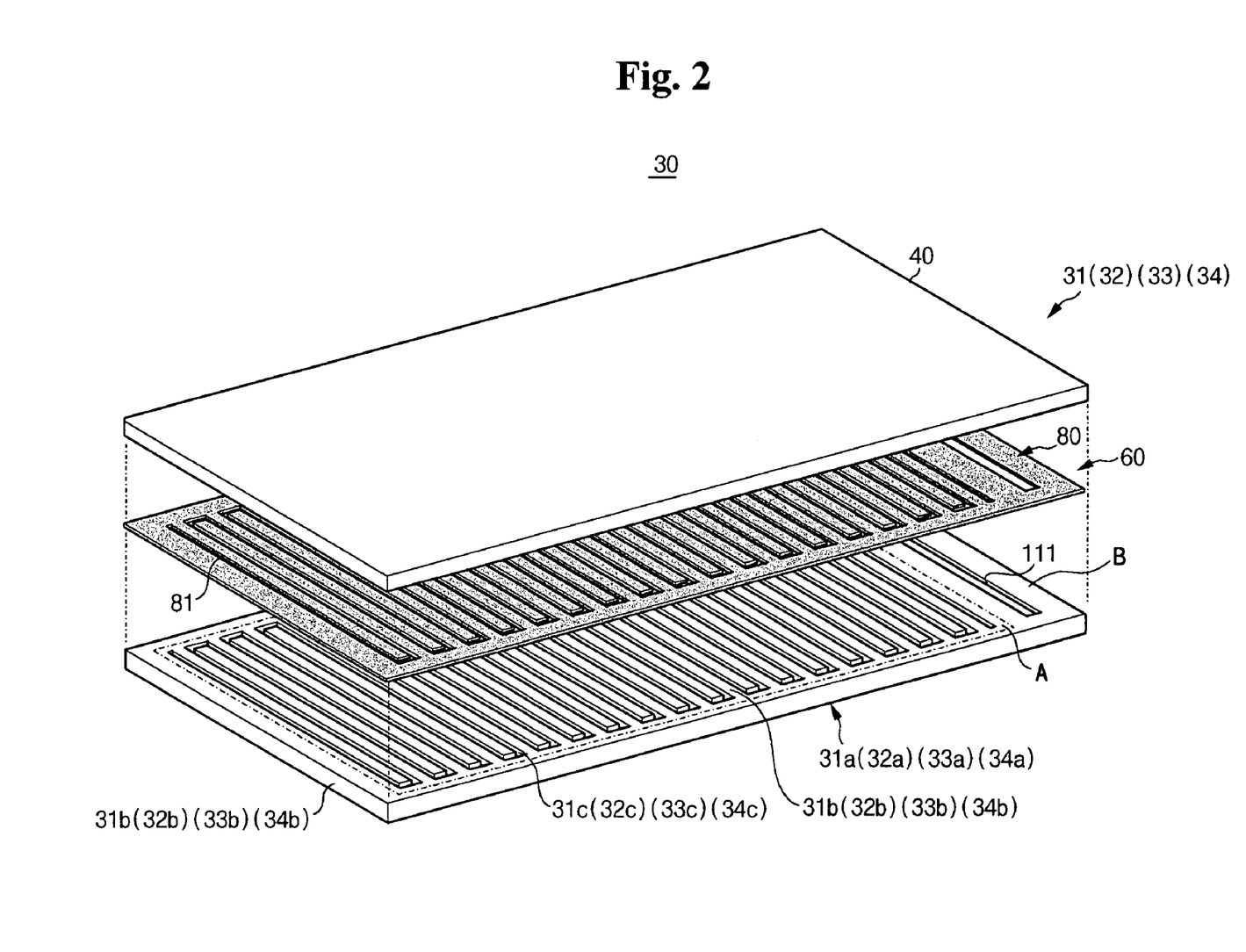
FIG. 2 is an exploded perspective view illustrating a structure of a reformer for a fuel cell according to an exemplary embodiment of the present invention.
Figure 3:
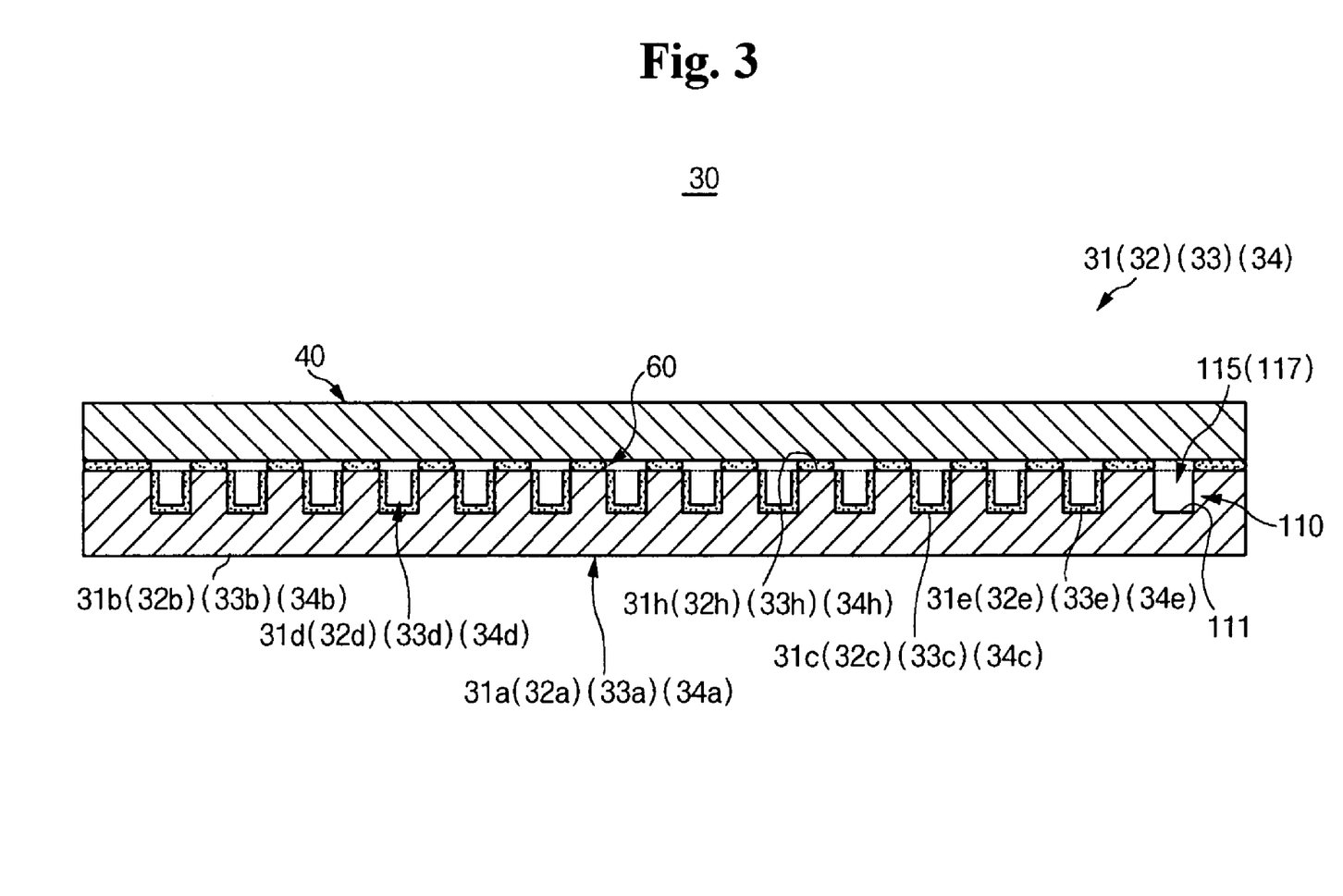
FIG. 3 is a cross-sectional view illustrating a coupled structure of the reformer shown in FIG. 2.

FIG. 2 is an exploded perspective view illustrating the structure of the reformer 30 according to an exemplary embodiment of the present invention, and FIG. 3 is a cross-sectional view of a coupled structure of the reformer 30 shown in FIG. 2.

Referring to the FIGS. 2 and 3, the reformer 30 according to the present embodiment has reaction parts 31, 32, 33, and/or 34 that can generate thermal energy by an oxidation reaction of the fuel and the air, generate reformed gas containing hydrogen by a reforming reaction using the thermal energy, and reduce the concentration of carbon monoxide contained in the reformed gas.

Specifically, the reaction parts 31, 32, 33, and 34 can include a heat source part 31 for generating the thermal energy by an oxidation of the fuel and the air, a reforming reaction part 32 for generating the reformed gas containing hydrogen by a reforming reaction of the fuel using the thermal energy, a first carbon-monoxide reducing part 33 for primarily reducing the concentration of carbon monoxide contained in the reformed gas by a water-gas shift (WGS) reaction of the reformed gas, and a second carbon-monoxide reducing part 34 for secondarily reducing the concentration of carbon monoxide contained in the reformed gas by a preferential CO oxidation (PROX) reaction of the reformed gas. Here, the reformer 30 according to the present embodiment may be formed by stacking the reaction parts 31, 32, 33, and/or 34 adjacent to one another.

In the present embodiment, each of the reaction parts 31, 32, 33, and 34 has a corresponding reaction plate 31a, 32a, 33a, or 34a in which a corresponding channel 31c, 32c, 33c, or 34c is formed in a surface thereof. In addition, a cover plate 40 is disposed on the surface of each of the reaction plates 31a, 32a, 33a, and 34a.

Each of the reaction plates 31a, 32a, 33a, and 34a has a rectangular plate shape, has a predetermined width and a predetermined length, and is made of metal such as aluminum, stainless steel, copper, nickel, and/or iron. Also, each of the reaction plates 31a, 32a, 33a, and 34a has a first portion A defining the corresponding channel 31c, 32c, 33c, or 34c; and a second portion B (or a portion other than the first portion A).

Each of the cover plates 40 is a plate for covering a surface of the corresponding reaction plate 31a, 32a, 33a, or 34a and is made of the same metal as the corresponding reaction plate 31a, 32a, 33a, or 34a.

A bonding part 60 for fixing each of reaction plates 31a, 32a, 33a, and 34a with the corresponding cover plate 40 is formed between each of the reaction plates 31a, 32a, 33a, and 34a and the corresponding cover plate 40. The bonding part 60 will be described in more detail below.

In the present embodiment, the heat source part 31 is a heat emitting reaction part for generating thermal energy in a predetermined range of temperature necessary for reforming the fuel and serves to combust the fuel and the air by an oxidation reaction of the fuel and the air using a catalyst.

The heat source part 31 includes the plate-shaped first reaction plate 31a in which the first channel 31c for allowing the fuel and the air to flow is formed. An oxidation catalyst layer 31e for promoting the oxidation of the fuel and the air is formed on the surface of the first channel 31c. The first channel 31c can be formed in a space between ribs 31h which are protruded from the upper surface of the plate body 31b to be spaced apart from each other. The first channel 31c is formed by disposing flow channels in straight-line shapes with a predetermined gap therebetween on the plate body 31b and alternately connecting the ends of the flow channels such that the flow channels define a serpentine flow path. Each of the second, third, and fourth channels 32c, 33c, and 34c to be described below may have substantially the same shape as the first channel 31c.

With the cover plate 40 disposed on the upper surface of the first reaction plate 31a, a first passage 31d for allowing the fuel and the air to flow can be formed by a cover surface of the cover plate 40 and the first channel 31c.

Therefore, when the fuel and the air are supplied to the first passage 31d, the heat source part 31 according to the present embodiment generates thermal energy in a predetermined range of temperatures by the oxidation reaction of the fuel and the air using the oxidation catalyst layer 31e.

The reforming reaction part 32 absorbs the thermal energy generated from the heat source part 31 and generates the reformed gas containing hydrogen by the reforming reaction of the fuel supplied from the fuel supply unit 50.

The reforming reaction part 32 includes the plate-shaped second reaction plate 32a in which the second channel 32c for allowing the fuel to flow is formed. Also, a reforming catalyst layer 32e for promoting the reforming reaction of the fuel is formed on the surface of the second channel 32c.

With the cover plate 40 disposed on the upper surface of the second reaction plate 32a, a second passage 32d for allowing the fuel to flow can be formed by a cover surface of the cover plate 40 and the second channel 32c.

Therefore, when the fuel is supplied to the second passage 32d in a state where the thermal energy of the predetermined range of temperatures is absorbed from the heat source part 31, the reforming reaction part 32 according to the present embodiment generates the reformed gas containing hydrogen by the reforming reaction of the fuel using the reforming catalyst layer 32e.

The first carbon-monoxide reducing part 33 concentrates hydrogen of the reformed gas by the water-gas shift reaction of carbon monoxide contained in the reformed gas at the predetermined range of temperatures supplied from the reforming reaction part 32 to reduce the concentration of carbon monoxide.

The first carbon-monoxide reducing part 33 includes the plate-shaped third reaction plate 33a in which the third channel 33c for allowing the reformed gas to flow is formed. Also, a water-gas shift catalyst layer 33e for promoting the water-gas shift reaction of carbon monoxide is formed on the surface of the third channel 33c.

With the cover plate 40 disposed on the upper surface of the third reaction plate 33a, a third passage 33d for allowing the reformed gas to flow can be formed by a cover surface of the cover plate 40 and the third channel 33c.

Therefore, when the fuel is supplied to the second passage 32d in a state where the reformed gas generated from the reforming reaction part 32 is supplied to the third passage 33d, the first carbon-monoxide reducing part 33 according to the present embodiment concentrates hydrogen by the water-gas shift reaction of carbon-monoxide using the water-gas shift catalyst layer 33e to primarily reduce the concentration of carbon monoxide.

The second carbon-monoxide reducing part 34 is then supplied with the reformed gas, in which the concentration of carbon monoxide has been primarily reduced, from the first carbon-monoxide reducing part 33 and with the air from the oxygen supply unit 70, and generates heat to secondarily reduce the concentration of carbon monoxide contained in the reformed gas by the preferential CO oxidation reaction of carbon monoxide contained in the reformed gas and oxygen contained in the air.

The second carbon-monoxide reducing part 34 includes a plate-shaped fourth reaction plate 34a in which a fourth channel 34c for allowing the reformed gas and the air to flow is formed. Also, a preferential CO oxidation catalyst layer 34e for promoting the preferential CO oxidation reaction of carbon monoxide is formed on the surface of the fourth channel 34c.

With the cover plate 40 disposed on the upper surface of the fourth reaction plate 34a, a fourth passage 34d for allowing the reformed gas and the air to flow can be formed by a cover surface of the cover plate 40 and the fourth channel 34c.

Therefore, when the air and the reformed gas in which the concentration of carbon monoxide has been primarily reduced by the first carbon-monoxide reducing part 33 are supplied to the fourth passage 34d, the second carbon-monoxide reducing part 34 according to the present embodiment generates heat to secondarily reduce the concentration of carbon monoxide by the preferential CO oxidation of carbon monoxide contained in the reformed gas and oxygen contained in the air using the preferential CO oxidation catalyst layer 34e.

In the reaction parts 31, 32, 33, and 34 having the above-mentioned structures, bonding parts 60 integrally fixing the reaction plates 31a, 32a, 33a, and 34a and the cover plates 40 to each other are provided therebetween.

The bonding parts 60 can be formed in the contact portions between the reaction plates 31a, 32a, 33a, and 34a and the cover plates 40. The contact portions between the reaction plates 31a, 32a, 33a, and 34a and the cover plates 40 include portions of the reaction plates 31a, 32a, 33a, and 34a in which the channels 31c, 32c, 33c, and 34c are not formed and portions of the cover plates 40 which come in contact with the reaction plates 31a, 32a, 33a, and 34a.

In the present embodiment, the bonding parts 60 may be formed by melting metal. That is, each of the bonding parts 60 can be formed by brazing a metal film 80 having an opening 81 corresponding to the channel 31c, 32c, 33c, or 34c.

Therefore, in one embodiment of the present invention, the metal film 80 for forming the bonding parts 60 has a melting point lower than that of the materials forming the reaction plates 31a, 32a, 33a, and 34a and the cover plates 40. Accordingly, when forming each of the bonding parts 60 by heating the metal film 80, the reaction plates 31a, 32a, 33a, and 34a and the cover plates 40 can be closely fixed to each other without deforming the reaction plates 31a, 32a, 33a, and 34a and the cover plates 40.

The bonding parts 60 may be made of a material selected from the group consisting of copper, stainless steel, aluminum, nickel, iron, and alloys containing the respective metals. Here, when the bonding parts 60 are made of an alloy containing the materials of the reaction plates 31a, 32a, 33a, and 34a and the cover plates 40, it is possible to prevent cracks which can be generated due to different characteristics (e.g., thermal characteristics) between different kinds of metal.

In the present embodiment, the reaction plates 31a, 32a, 33a, and 34a and the cover plates 40 can be firmly fixed to each other through the bonding parts 60 made of metal.

In the reformer 30 according to the present embodiment, since the bonding parts 60 are formed by disposing the metal films 80 (see FIG. 2) between the reaction plates 31a, 32a, 33a, and 34a and the cover plates 40 and then brazing the metal films 80, the manufacturing process of the reformer 30 is simplified, thereby improving productivity. In addition, it is possible to improve air-tightness between the reaction plates 31a, 32a, 33a, and 34a and the respective cover plates 40 due to the use of the bonding parts 60.

In the reformer 30 having the above-mentioned structure, a heat processing part 110 according to the present invention is provided outside the channel of each of the reaction plates 31a, 32a, 33a, and 34a. The heat processing part 110 serves as a heat-insulating part or cooling part for regulating the thermal energy supplied from the reaction plates 31a, 32a, 33a, and 34a while reducing the contact areas between the reaction plates 31a, 32a, 33a, and 34a and the respective cover plates 40.

In the present embodiment, the heat processing parts 110 are formed as predetermined inner spaces formed outside the channels 31c, 32c, 33c, and 34c through the bonding between the reaction plates 31a, 32a, 33a, and 34a and the respective cover plates 40, where each inner space can be formed as a groove 111 formed in the second portion B of each reaction plate 31a, 32a, 33a, and 34a.

The groove 111 is formed in a channel shape in at least one edge of the corresponding second portion B of each of the reaction plates 31a, 32a, 33a, and 34a. In the present embodiment, as shown in the FIGS. 2 and 3, the groove 11 is longitudinally formed along one edge of each reaction plate 31a, 32a, 33a, and 34a.

Specifically, the grooves 111 can be formed as predetermined inner spaces by the brazing and bonding of the reaction plates 31a, 32a, 33a, and 34a with the cover plates 40. The inner spaces may serve as heat insulating parts 115 for insulating heat supplied to the first, second, and third reaction plates 31a, 32a, and 33a while still maintaining a vacuum. In addition, one of the inner spaces may be formed as a cooling passage for allowing a cooling medium to flow and may serve as a cooling part 117 for cooling the heat supplied from the fourth reaction plate 34a.

In the present embodiment, the heat insulating part 115 can be formed in a vacuum space for maintaining the vacuum through the groove 111 formed in the second portions B of each of the first, second, and third reaction plates 31a, 32a, and 33a while the first, second, and third reaction plates 31a, 32a, and 33a and the cover plates 40 are brazed and bonded in a vacuum furnace. That is, the heat insulating part 115 is formed as a vacuum space for the heat source part 31, the reforming reaction part 32, and the first carbon-monoxide reducing part 33, thereby insulating the thermal energy supplied to the reaction parts 31, 32, and 33 by using the vacuum space. Accordingly, each of the reaction parts 31, 32, and 33 can maintain its specific range of operating temperatures due to the use of the heat insulating part 115.

In the present embodiment, the cooling part 117 can be formed as a cooling passage for allowing a cooling medium to flow through the groove 111 formed in the second portion B of the fourth reaction plate 34a while the fourth reaction plate 34a and the cover plate 40 are brazed and bonded. That is, the cooling part 117 is formed as a cooling passage for the second carbon-monoxide reducing part 34, thereby cooling the heat generated from the second carbon-monoxide reducing part 34 by the preferential oxidation reaction of carbon monoxide and the air. Accordingly, the second carbon-monoxide reducing part 34 can maintain its specific range of operating temperatures due to the use of the cooling part 117.

FIGS. 4A to 4F are plan views of the reaction plate 31a, 32a, 33a, or 34a illustrating modified examples of the heat processing part 110 according to an embodiment of the present invention.

Figure 4A:
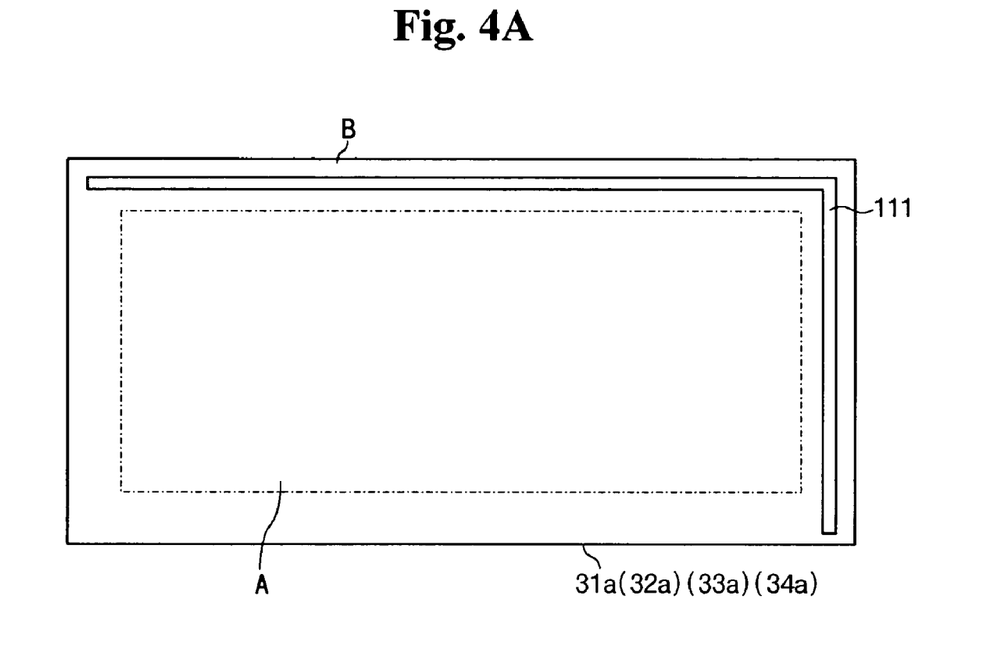
FIGS. 4A, 4B, 4C, 4D, 4E, and 4F are plan views of a reaction plate in which modified examples of a heat processing part according to an embodiment of the present invention are shown.

FIG. 4A is a first modified example of the heat processing part according to the present embodiment. In this case, the heat processing part 110 (see FIG. 3) can be constructed by the groove 111 which is formed in a channel shape in edges perpendicular to each other in the second portion B of each of the reaction plates 31a, 32a, 33a, and 34a.

Figure 4B:
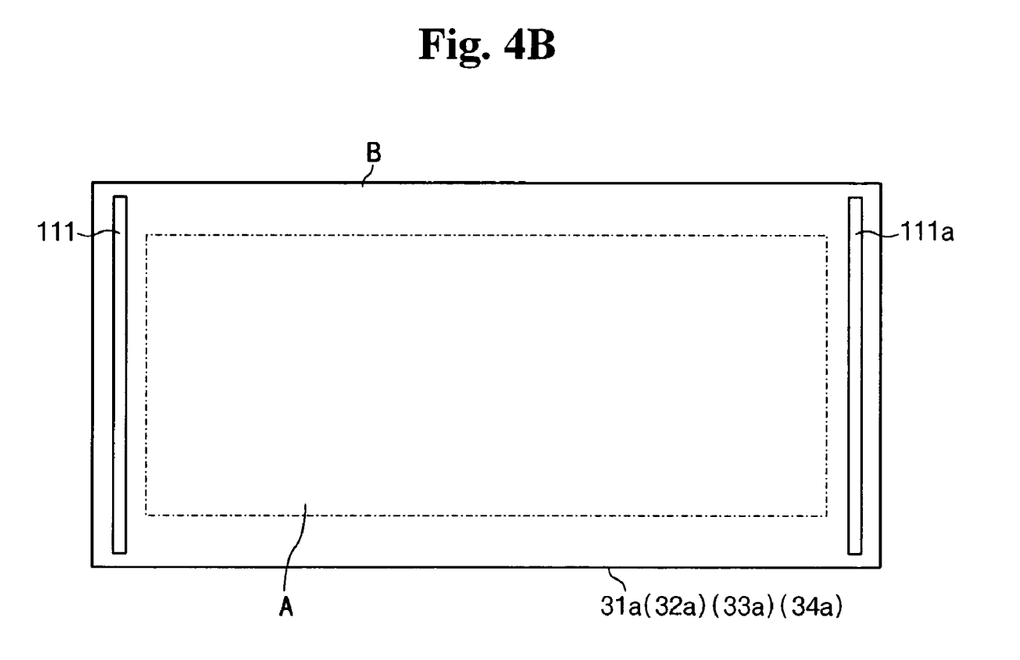

FIG. 4B is a second modified example of the heat processing part according to the present embodiment. In this case, the heat processing part 110 (see FIG. 3) can be constructed by the groove 111a which is formed in a channel shape in a pair of edges parallel to each other in the second portion B of each of the reaction plates 31a, 32a, 33a, and 34a.

Figure 4C:
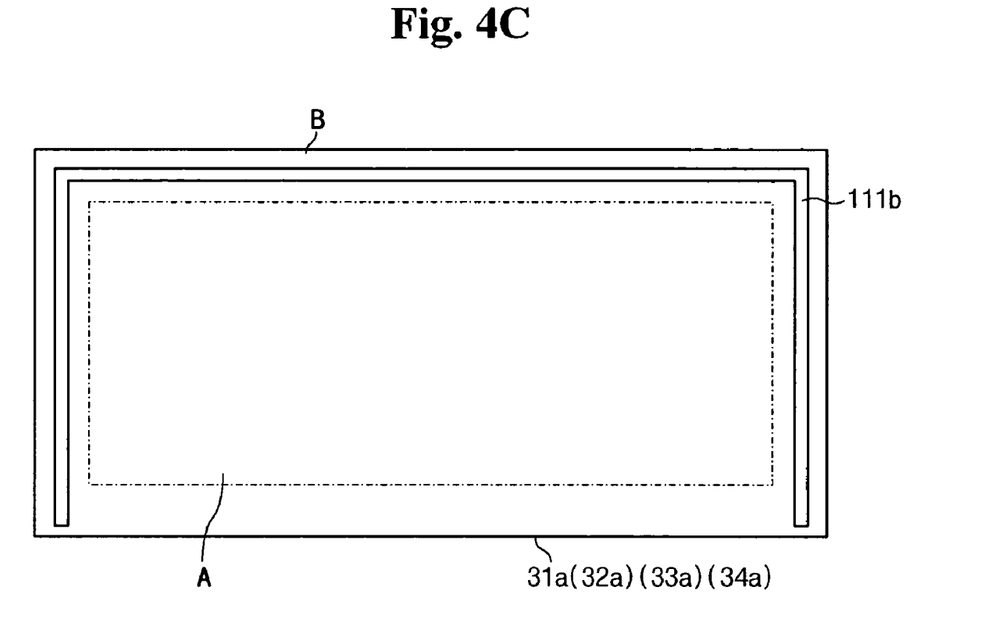

FIG. 4C is a third modified example of the heat processing part according to the present embodiment. In this case, the heat processing part 110 (see FIG. 3) can be constructed by the groove 111b which is formed in a channel shape in all the edges other than one edge in the second portion B of each of the reaction plates 31a, 32a, 33a, and 34a.

Figure 4D:
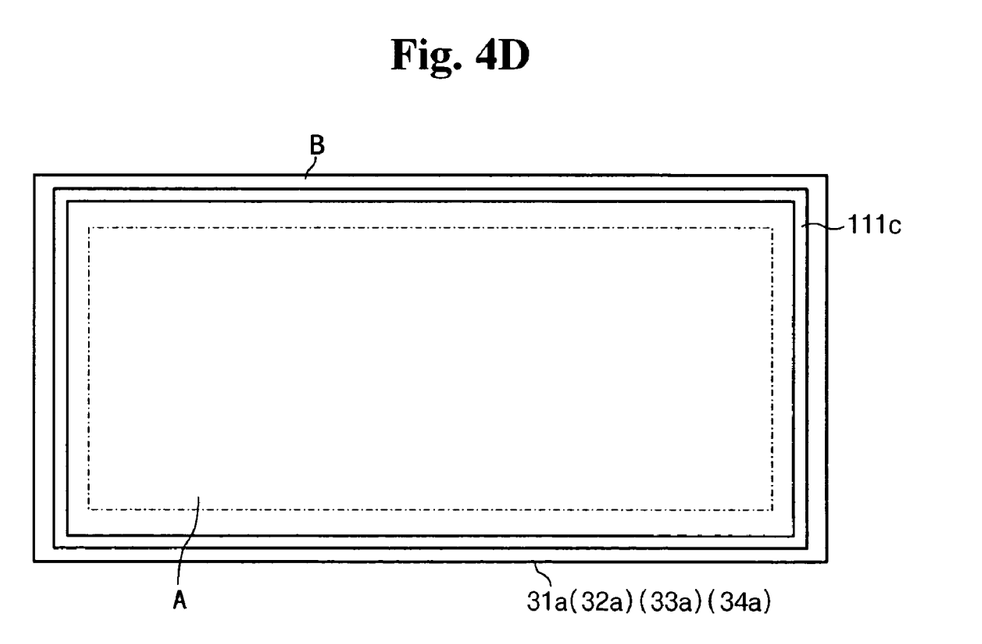

FIG. 4D is a fourth modified example of the heat processing part according to the present embodiment. In this case, the heat processing part 110 (see FIG. 3) can be constructed by the groove 111c which is formed in a channel shape in all the entire edges in the second portion B of each of the reaction plates 31a, 32a, 33a, and 34a so as to surround the first portion A of each of the reaction plates 31a, 32a, 33a, and 34a.

Figure 4E:
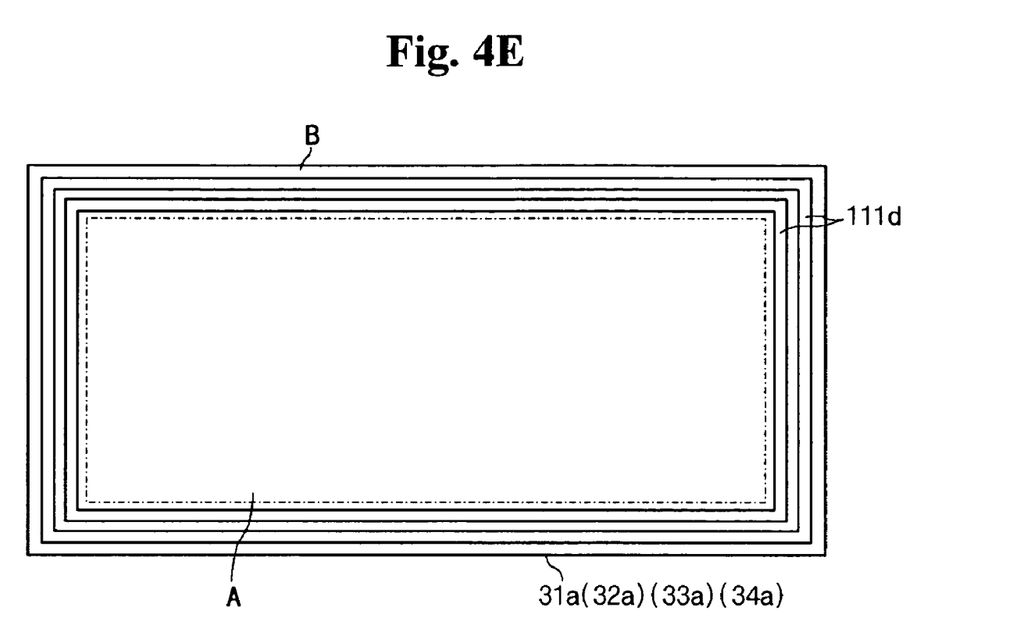

FIG. 4E is a fifth modified example of the heat processing part according to the present embodiment. In this case, the heat processing part 110 (see FIG. 3) can be constructed with inner and outer grooves 111d (or by doubly disposing the groove 111c of the fourth modified example of FIG. 4D). That is, each of the inner and outer grooves 111d is illustrated in FIG. 4E as being substantially the same in structure as the groove 111c of the fourth modified example of FIG. 4D. However, the structure of the fifth modified example of the present invention is not limited to the structure of modified example of FIG. 4D, and the heat processing part 110 may be constructed by doubly disposing the grooves as in any of the above-mentioned modified examples in the second portion B of each of the reaction plates 31a, 32a, 33a, and 34a.

Figure 4F:
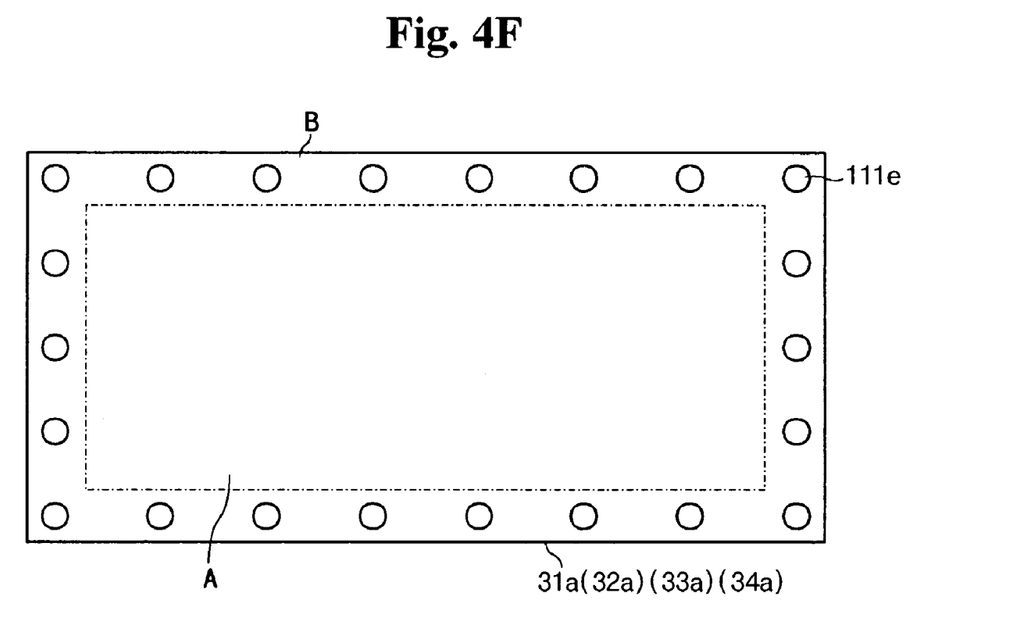

FIG. 4F is a sixth modified example of the heat processing part according to the present embodiment. In this case, the heat processing part 110 (see FIG. 3) can be constructed by a plurality of grooves (or a plurality of circular grooves) 111 which are continuously disposed with a predetermined interval from each other along the edges in the second portion B of each of the reaction plates 31a, 32a, 33a, and 34a.

Figure 5:
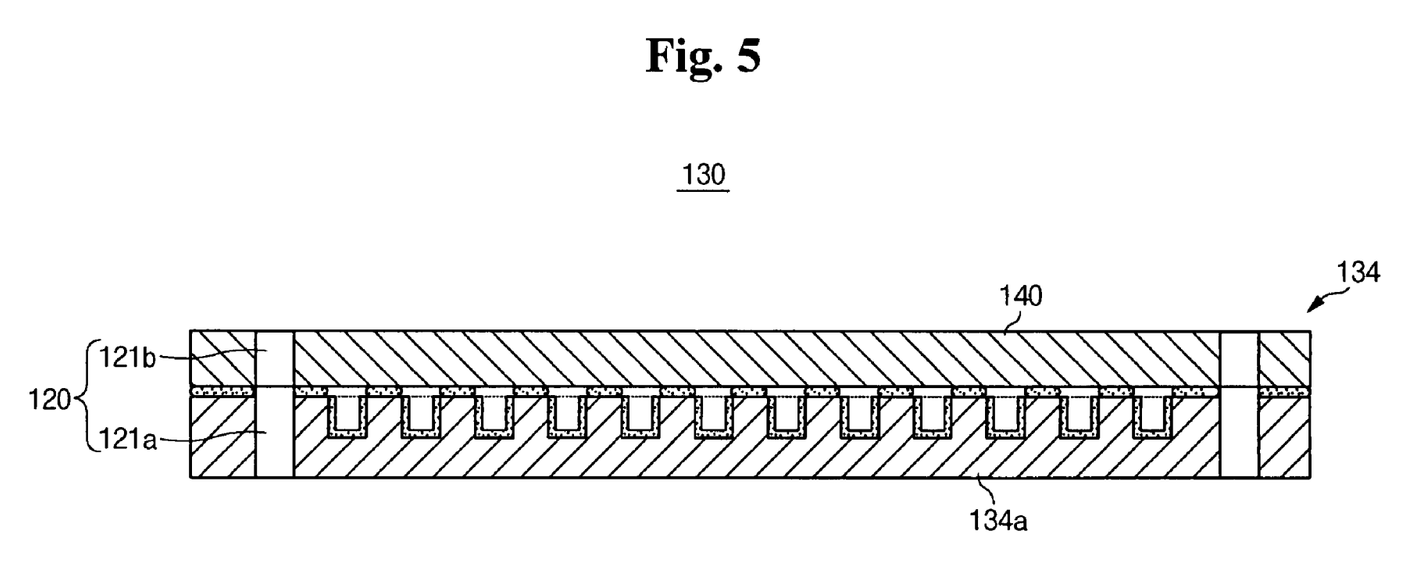
FIG. 5 is a cross-sectional view illustrating a structure of a reformer for a fuel cell according to another exemplary embodiment of the present invention.

FIG. 5 is a cross-sectional view illustrating a structure of a reformer 130 for a fuel cell according to another exemplary embodiment of the present invention.

Referring to the FIG. 5, the reformer 130 according to the present embodiment includes a heat processing part 120 which has a plurality of first holes 121a formed in edges of a fourth reaction plate 134a of a second carbon-monoxide reducing part 134 and a plurality of second holes 121b formed in edges of a cover plate 140. The plurality of second holes 121b correspond to the first holes 121a so as to communicate with the first holes 121a.

Since the heat processing part 120 is formed in the second carbon-monoxide reducing part 134, it can serve as a cooling passage for allowing the coolant to flow through the first holes 121a and the second holes 121b.

Other structures and operations of the reformer 130 according to the present embodiment are substantially the same as those of the above-described embodiments of the present invention and thus detailed descriptions thereof will not be provided.

Figure 6:
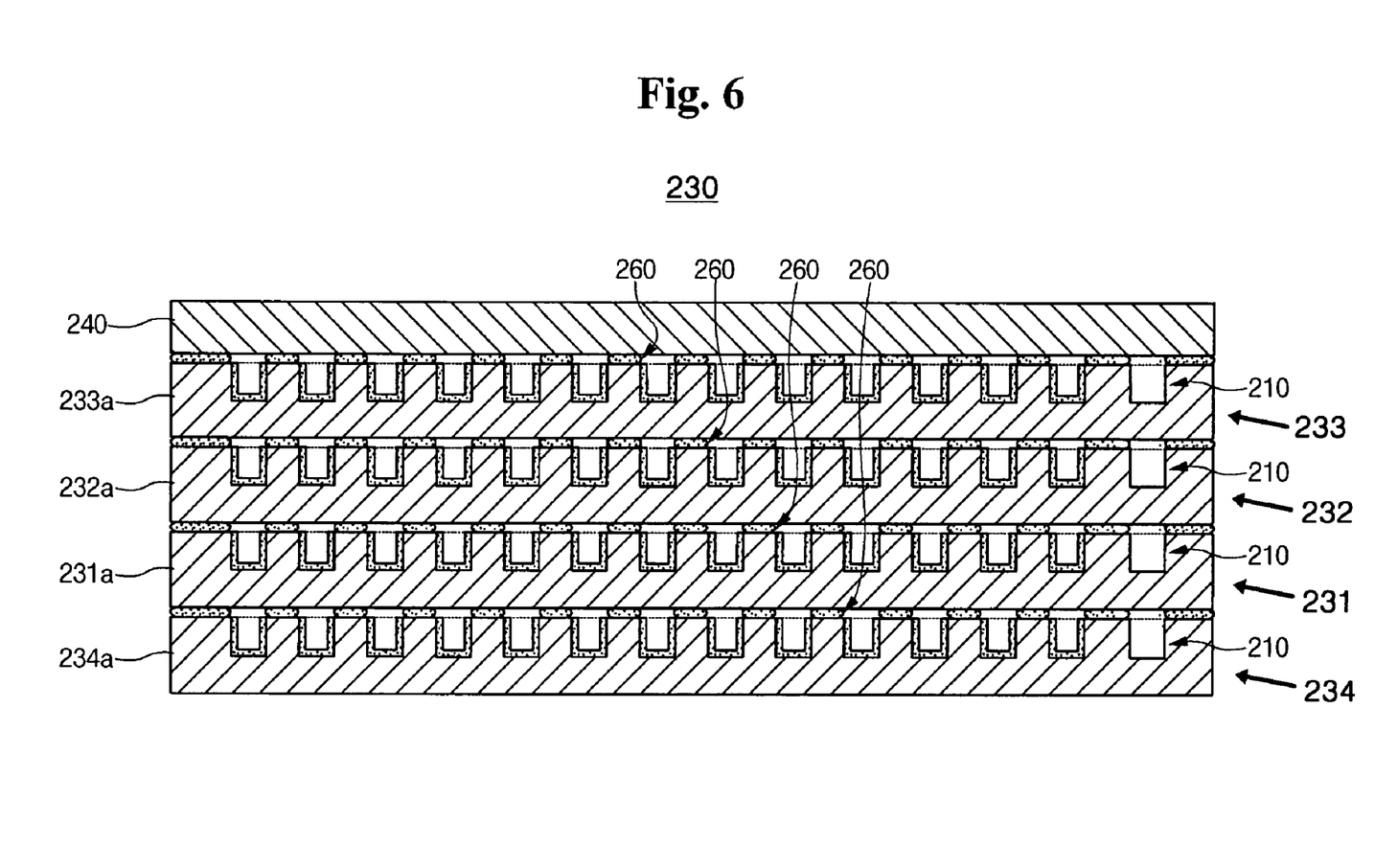
FIG. 6 is a cross-sectional view illustrating a structure of a reformer for a fuel cell according to still another exemplary embodiment of the present invention.

FIG. 6 is a cross-sectional view illustrating a structure of a reformer 230 for a fuel cell according to still another exemplary embodiment of the present invention.

Referring to FIG. 6, the reformer 230 according to the present embodiment has a structure where reaction parts 231, 232, 233, and 234, which are substantially the same as the reaction parts 31, 32, 33, and 34 (or 134) in the above-described embodiments, are stacked adjacent to one another.

The reformer 230 can be constructed by sequentially stacking the reforming reaction part 232 and the first carbon-monoxide reducing part 233 on (or above) the heat source part 231 and then stacking the second carbon-monoxide reducing part 234 under the heat source part 231.

Specifically, the reformer 230 according to the present embodiment can be constructed by sequentially stacking the second reaction plate 232a, the third reaction plate 233a, and the cover plate 240 on the upper surface of the first reaction plate 231a and stacking the fourth reaction plate 234a on the lower surface of the first reaction plate 231a.

Bonding parts 260 integrally fixing the reaction plates 231a, 232a, 233a, and 234a and the cover plate 240 to each other are formed therebetween. A heat processing part 210 for regulating the thermal energy supplied to each of the reaction plates 231a, 232a, 233a, and 234a is formed in each of the reaction parts 231, 232, 233, and 234.

In FIG. 6, since the bonding parts 260 and the heat processing parts 210 have substantially the same structures as the bonding parts 60 and the heat processing parts 210 in the above-described embodiments, detailed description thereof will not be provided for the present embodiment.

According to the present invention described above, since a reformer has a simple structure formed in a plate type, it is possible to compactly embody an entire structure of a fuel cell system.

In addition, according to the present invention, since the reformer is formed by stacking a plurality of reaction parts with the heat processing parts that regulate the thermal energy supplied to the reaction parts, the thermal efficiency and the reaction efficiency of the reformer are improved.

While the invention has been described in connection with certain exemplary embodiments, it is to be understood by those skilled in the art that the invention is not limited to the disclosed embodiments, but, on the contrary, is intended to cover various modifications included within the spirit and scope of the appended claims and equivalents thereof.

What is claimed is:

1. A reformer for a fuel cell comprising:
   at least one reaction plate having a channel formed in a surface thereof;
   a cover plate on the surface of the at least one reaction plate;
   a bonding part formed between the at least one reaction plate and the cover plate to integrally fix the at least one reaction plate and the cover plate to each other; and
   a heat processing part formed in the surface of the at least one reaction plate along at least one edge of the at least one reaction plate and outside the channel,
   wherein a passage is defined by the channel and a surface of the cover plate, and an inner space is defined by the heat processing part and the surface of the cover plate to reduce a contact area between the at least one reaction plate and the cover plate and to control thermal energy supplied to the at least one reaction plate.

2. The reformer of claim 1, wherein the at least one reaction plate has a first portion defining an area of the channel and a second portion defining an area other than the first portion.

3. The reformer of claim 2, wherein the heat processing part includes at least one groove formed in the surface of the at least one reaction plate corresponding to the area of the second portion.

4. The reformer of claim 3, wherein the inner space comprises a vacuum space adapted to maintain a vacuum state and formed through a bonding between the at least one reaction plate and the cover plate, and
   wherein the vacuum space comprises a heat insulating part adapted to insulate a heat supplied to the at least one reaction plate.

5. The reformer of claim 3, wherein the at inner space comprises a cooling passage adapted to allow a cooling medium to flow and formed through a bonding between the at least one reaction plate and the cover plate, and
   wherein the cooling passage comprises a cooling part adapted to cool a heat supplied to the at least one reaction plate.

6. The reformer of claim 3, wherein the at least one groove is formed along a plurality of edges of the at least one reaction plate so as to surround the entire first portion.

7. The reformer of claim 6, wherein a plurality of grooves are provided.

8. The reformer of claim 1, wherein the bonding part is fused in a contact portion between the at least one reaction plate and the cover plate to bond the at least one reaction plate with the cover plate.

9. The reformer of claim 8, wherein the bonding part is made of metal having a melting point lower than a melting point of a material constituting the at least one reaction plate and the cover plate.

10. The reformer of claim 9, wherein the bonding part is formed by a brazing material.

11. The reformer of claim 1, wherein a catalyst layer is formed in the channel of the at least one reaction plate.

12. A reformer for a fuel cell comprising:
a plurality of reaction parts formed by stacking a plurality of reaction plates adjacent to one another, each of the reaction plates including a channel formed in a surface thereof, wherein the surface of each of the reaction plates other than an uppermost one of the reaction plates is facing an opposite surface of a corresponding adjacent reaction plate of the reaction plates;
a cover plate on the surface of the uppermost one of the reaction plates;
a bonding part formed between the reaction plates and between the uppermost one of the reaction plates and the cover plate to integrally fix the reaction plates and the cover plate to each other; and
a heat processing part formed in the surface of at least one of the reaction plates along at least one edge of the at least one of the reaction plates and outside the channel,
wherein a plurality of passages are defined by the respective channels and the surfaces of the corresponding adjacent reaction plates or the cover plate, and an inner space is defined by the heat processing part and the surface of the corresponding adjacent reaction plate or the cover plate to control thermal energy supplied to the at least one of the reaction plates.

13. The reformer of claim 12, wherein the heat processing part includes at least one groove formed in the surface of the at least one of the reaction plates.

14. The reformer of claim 13, wherein the inner space comprises a vacuum space adapted to maintain a vacuum state and formed through a bonding of the at least one of the reaction plates and the corresponding adjacent reaction plate or the cover plate, and
wherein the vacuum space comprises a heat insulating part adapted to insulate a heat supplied to the reaction parts.

15. The reformer of claim 13, wherein the inner space comprises a cooling passage adapted to allow a cooling medium to flow and formed through a bonding of the at least one of the reaction plates and the corresponding adjacent reaction plate or the cover plate, and
wherein the cooling passage comprises a cooling part adapted to cool a heat supplied to the reaction parts.

16. The reformer of claim 12, wherein the bonding part is formed by brazing metal.

17. The reformer of claim 12, wherein a catalyst layer is formed in the channel of each of the reaction plates.

18. The reformer of claim 17, wherein the reaction parts include:
a heat source part comprising a heat-source-part reaction plate having a first catalyst layer formed in its channel, the heat source part being adapted to generate thermal energy by an oxidation reaction of a fuel and an oxidant; and
a reforming reaction part comprising a reforming-reaction-part reaction plate having a second catalyst layer formed in its channel, the reforming reaction part being adapted to generate a reformed gas from the fuel by a reforming reaction of the fuel using the thermal energy generated by the heat source part.

19. The reformer of claim 18, wherein the reaction parts further include at least one carbon-monoxide reducing part comprising a carbon-monoxide-reducing-part reaction plate having at least one of a third catalyst layer formed in its channel, the at least one carbon-monoxide reducing part being adapted to reduce a concentration of carbon monoxide contained in the reformed gas generated by the reforming reaction part.

20. A reformer for a fuel cell comprising:
a plurality of reaction plates stacked adjacent to one another, each of the reaction plates including a channel formed in a surface thereof;
a cover plate;
a bonding part formed between at least one of the reaction plates and the cover plate to integrally fix the at least one of the reaction plates and the cover plate to each other; and
a heat processing part formed in the surface of the at least one of the reaction plates along at least one edge of the at least one of the reaction plates and outside the channel,
wherein a passage is defined by the channel of the at least one of the reaction plates and a surface of the cover plate, and an inner space is defined by the heat processing part and the surface of the cover plate to control thermal energy supplied to the at least one of the reaction plates.

21. The reformer of claim 20, further comprising:
a second bonding part formed between at least two other reaction plates to integrally fix the at least two other reaction plates to each other; and
second and third heat processing parts formed in the at least two other reaction plates, respectively,
wherein the surface of each of the at least two other reaction plates is facing an opposite surface of a corresponding adjacent reaction plate, and wherein respective passages are defined by the respective channels and the surfaces of the corresponding adjacent reaction plates, and respective inner spaces are defined by the second and third heat processing parts and the surfaces of the corresponding adjacent reaction plates to control thermal energy respectively supplied to the at least two other reaction plates.

22. The reformer of claim 21, wherein the inner space corresponding to the second heat processing part comprises a vacuumed space adapted to insulate a heat supplied to one of the at least two other reaction plates, and wherein the inner space corresponding to the third heat processing part comprises a cooling passage adapted to allow a cooling medium to flow to cool a heat supplied to another one of the at least two other reaction plates.

* * * * *

UNITED STATES PATENT AND TRADEMARK OFFICE
CERTIFICATE OF CORRECTION

| | | |
|---|---|---|
| PATENT NO. | : 7,887,605 B2 | Page 1 of 1 |
| APPLICATION NO. | : 11/254825 | |
| DATED | : February 15, 2011 | |
| INVENTOR(S) | : Zin-Min Park et al. | |

It is certified that error appears in the above-identified patent and that said Letters Patent is hereby corrected as shown below:

On the Title Page

(54) Title                    Before "REFORMER"
                              Insert -- PLATE TYPE --

In the Claims

Column 10, Claim 5, line 61    Delete "at"

Signed and Sealed this
Twenty-first Day of August, 2012

David J. Kappos
*Director of the United States Patent and Trademark Office*

UNITED STATES PATENT AND TRADEMARK OFFICE
CERTIFICATE OF CORRECTION

PATENT NO. : 7,887,605 B2  Page 1 of 1
APPLICATION NO. : 11/254825
DATED : February 15, 2011
INVENTOR(S) : Zin-Min Park et al.

It is certified that error appears in the above-identified patent and that said Letters Patent is hereby corrected as shown below:

On the Title page, Item (54) and at Column 1, line 1

Title  Before "REFORMER"
 Insert -- PLATE TYPE --

In the Claims

Column 10, Claim 5, line 61  Delete "at"

This certificate supersedes the Certificate of Correction issued August 21, 2012.

Signed and Sealed this
Eleventh Day of September, 2012

David J. Kappos
*Director of the United States Patent and Trademark Office*